June 5, 1962 J. J. KERLEY, JR., ET AL 3,037,728
VIBRATION ISOLATOR MOUNT
Filed June 26, 1958 4 Sheets-Sheet 1

INVENTORS
JAMES J. KERLEY, JR.
RAYMOND G. HARTENSTEIN
BY ROBERT F. CECCE

Walter G. Finch
ATTORNEY

June 5, 1962  J. J. KERLEY, JR., ET AL  3,037,728
VIBRATION ISOLATOR MOUNT
Filed June 26, 1958  4 Sheets-Sheet 2
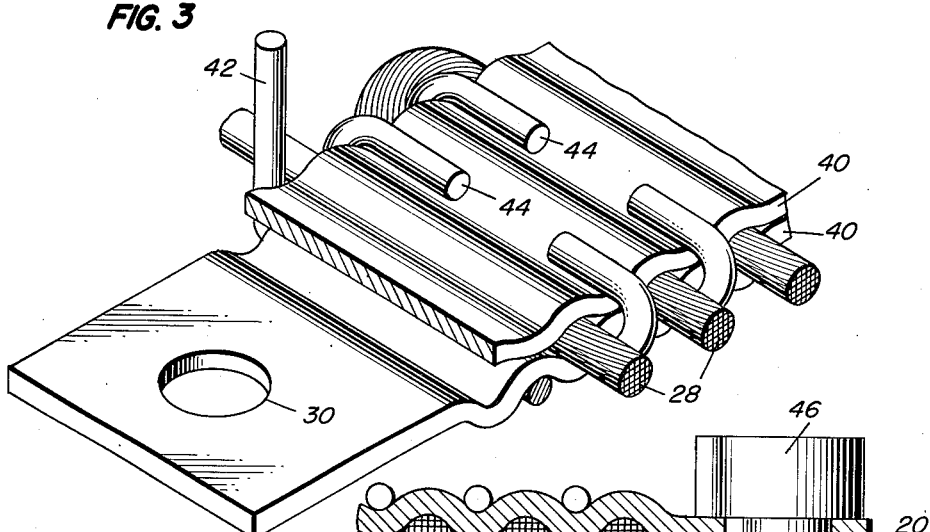
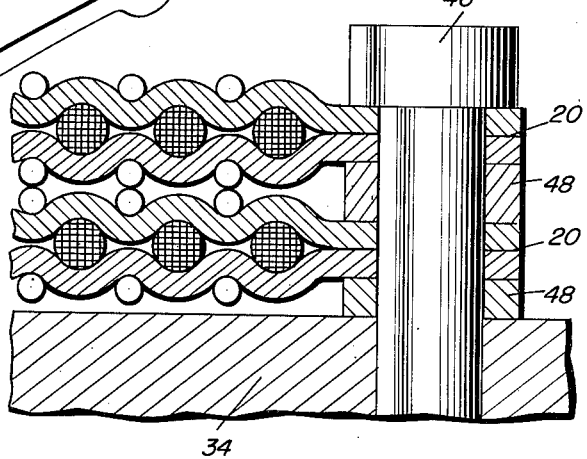
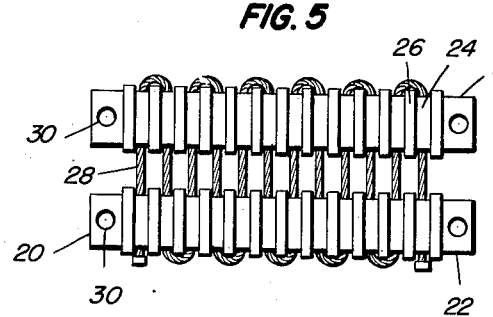
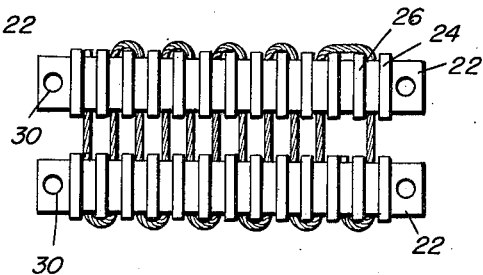
INVENTORS
JAMES J. KERLEY, JR.
RAYMOND G. HARTENSTEIN
BY ROBERT F. CECCE
Walter G. Finch
ATTORNEY June 5, 1962 J. J. KERLEY, JR., ET AL 3,037,728
VIBRATION ISOLATOR MOUNT
Filed June 26, 1958 4 Sheets-Sheet 3

INVENTORS
JAMES J. KERLEY, JR.
RAYMOND G. HARTENSTEIN
BY ROBERT F. CECCE

Walter G. Finch
ATTORNEY

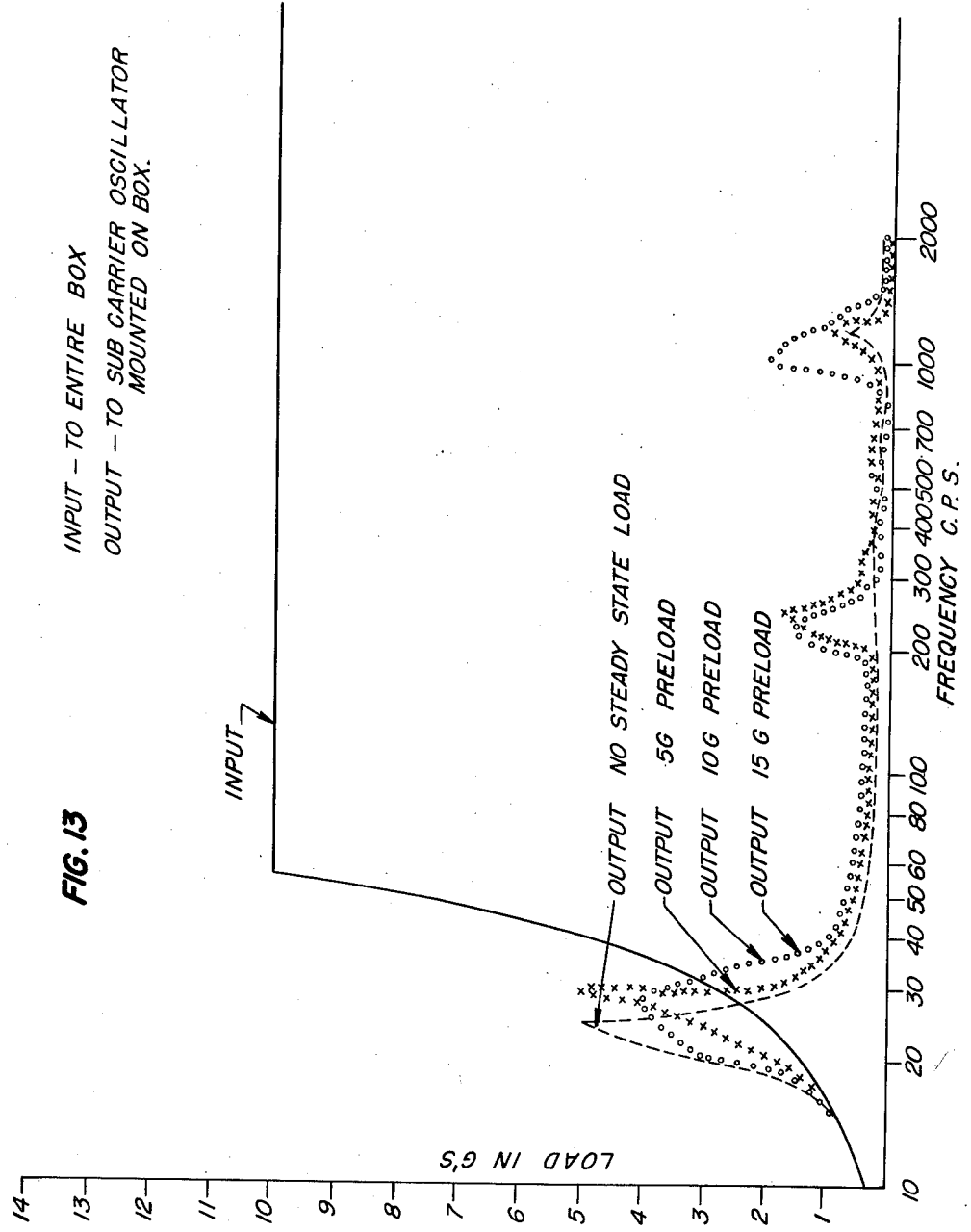

United States Patent Office 3,037,728
Patented June 5, 1962

3,037,728
VIBRATION ISOLATOR MOUNT
James J. Kerley, Jr., Cheverly, Raymond G. Hartenstein, Glen Burnie, and Robert F. Cecce, Takoma Park, Md.; said Kerley and Hartenstein assignors to Kerley Engineering, Inc., Cheverly, Md., a corporation of Maryland, and said Cecce assignor to Litton Systems Incorporated, a corporation of California
Filed June 26, 1958, Ser. No. 744,787
14 Claims. (Cl. 248—18)

This invention relates generally to spring support devices, and more particularly it pertains to vibration isolators.

Engines, testing machines, electronic boxes, gyroscopes and similar devices, require isolation or shock mounts to protect them or other associated equipment from vibration damage.

It is the primary object of this invention, therefore, to utilize the two-plane flexure of rod elements in an assembly to provide vibration isolation between a device and its support in any and all desired directions.

It is another object of the invention to provide a structural support of great strength having a high degree of flexibility.

Another object of this invention is to provide an all-metal shock mount structure, fireproof and with electrical grounding properties.

Still another object of this invention is to provide as an article of manufacture a unit of vibration isolation structure which can be grouped with similar units to provide any degree of support with any degree of vibration attenuation.

These and other objects and advantages of this invention will become more readily apparent and understood from the accompanying detailed specification and drawings in which:

FIG. 3 is a perspective view in detail of one arrangement for constructing a vibration isolator according to the present invention;

FIG. 4 is a cross section of a portion of the shock mount of FIG. 3, showing a multiple application and mounting means;

FIG. 5 illustrates a plan view of a shock mount element according to the invention;

FIG. 6 shows a plan view of an alternate arrangement of stringing the resilient cables;

FIG. 13 is a set of typical curves for the isolation system of this invention.

Figure 1:
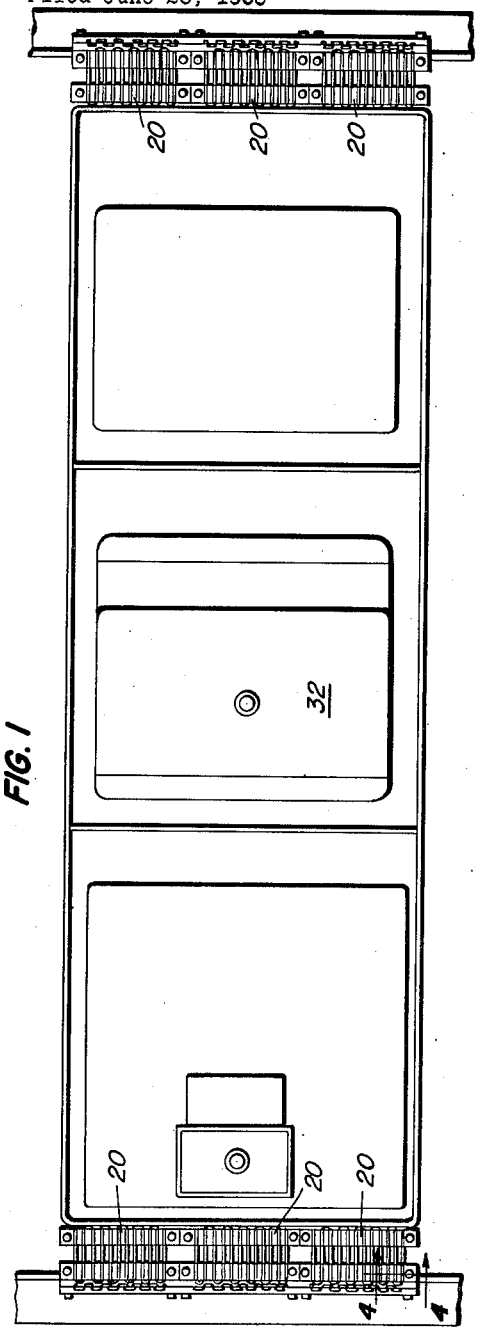
FIG. 1 is a top plan view of an electronic unit showing the application thereto of one embodiment of this invention.

Referring now to FIG. 5 of the darwings, there is illustrated generally a vibration isolator 20. Isolator 20 consists of two comb strips 22 which are milled, broached or extruded so as to have a series of alternating grooves 24 and ridges 26. A resilient cable 28, which may be solid or stranded, of metal or plastic is passed back and forth between the two comb strips 22 and secured thereto by crimping or otherwise.

Comb strips 22 are thus joined together by a plurality of passes of cable 28 and can be flexed with respect to each other. Strips 22 are also perforated at their ends by holes 30 for mounting purposes.

Figure 2:
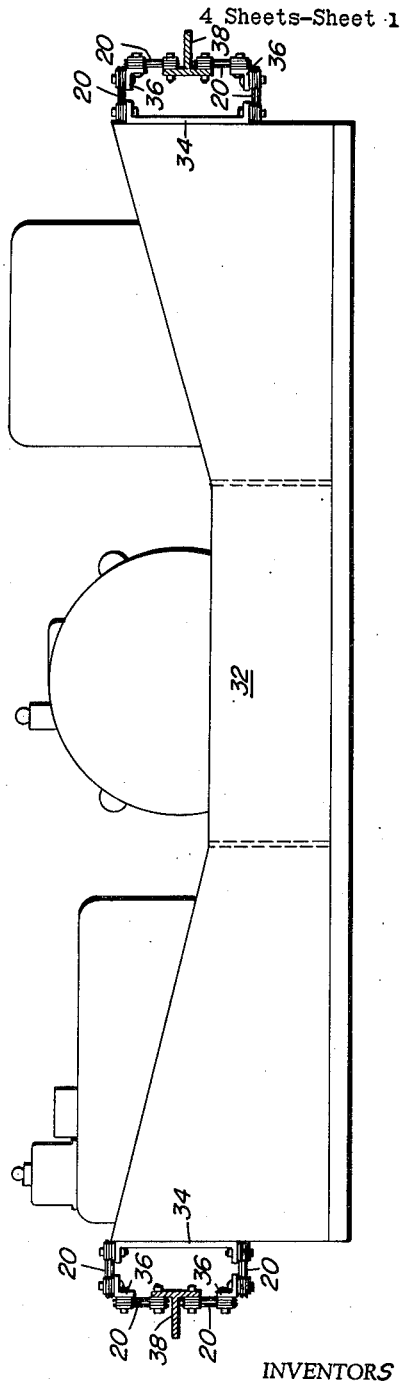
FIG. 2 is a side plan view of FIG. 1.

FIGS. 1 and 2 show a typical application of the vibration isolator to an electronic unit 32. Unit 32 may be an electronic chassis as illustrated requiring freedom from extraneous shock and vibration or may be a motor or engine whose own vibrations are to be contained. Depending upon the load to be carried, a plurality of vibration isolators 20 are horizontally mounted at each end of the unit 32 on a bracket 34. Bracket 34 is U-shaped and mounts pairs of isolators 20 one above the other as best seen in FIG. 2.

By means of a length of structural angle 36, additional vibration isolators 20 are mounted vertically to the others. A length of T-shaped structure 38 joins together the ends of these vertical isolators 20 and serves as a support for the load.

It will be seen from this construction that a freedom of motion for the supported unit 32 exists in all directions subject to the principles of Hooke's law.

Comb strips 22 may be one piece with the cables 28 crimped or soldered thereto or they may be cast therearound. Alternatively they may be two piece, with the cables 28 clamped there-between.

Another two piece arrangement for securing the cables 28 is illustrated in FIG. 3. Two tie strips 40 are made from strip stock and corrugated transversely. The corrugated portions of one strip 40 are placed in opposition to those of the other strip 40 and cable 28 is reeved through the passages formed thereby.

A round or flat wire 42 is formed under and around the corrugations as shown to form a staple 44 between each cable 28. Staple 44 thus serves to separate the passes of cable 28 from each other and furthermore urges the two pieces of tie strip 40 together.

A headed bolt or rivet 46, as shown in the cross sectional view of FIG. 4, may be used with spacers 48 to stack together several isolators 20 if desired for additional load-bearing ability.

Figure 9:
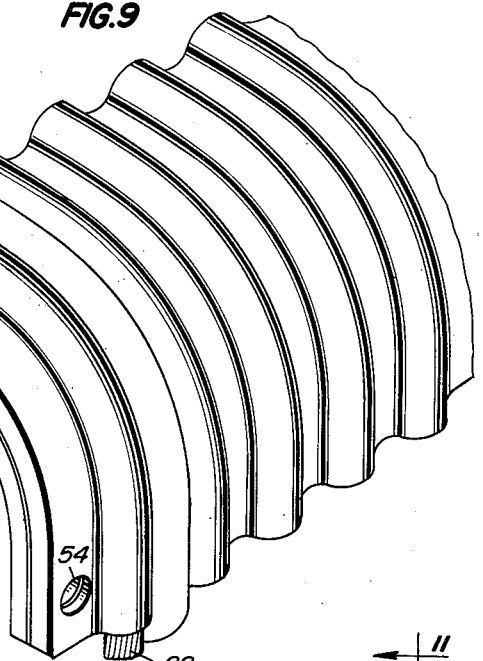
FIG. 9 is a perspective view of a corner former piece for the vibration isolator.
Figure 12:
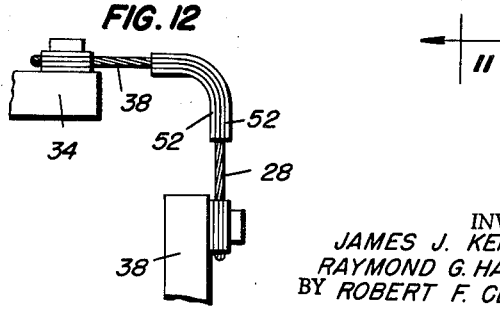
FIG. 12 is a side view showing the application of the part illustrated in FIG. 9.

An alternate assembly which combines the horizontal and vertical isolators 20 into one right angle isolator 50 is shown in FIG. 12. It will be seen that this construction dispenses with structural angle 36 of FIG. 2 and substitutes a pair of bent corrugated sheets 52, as best seen in FIG. 9.

The cables 28, seated in the corrugations of sheets 52, are thus made to change direction.

Figure 10:
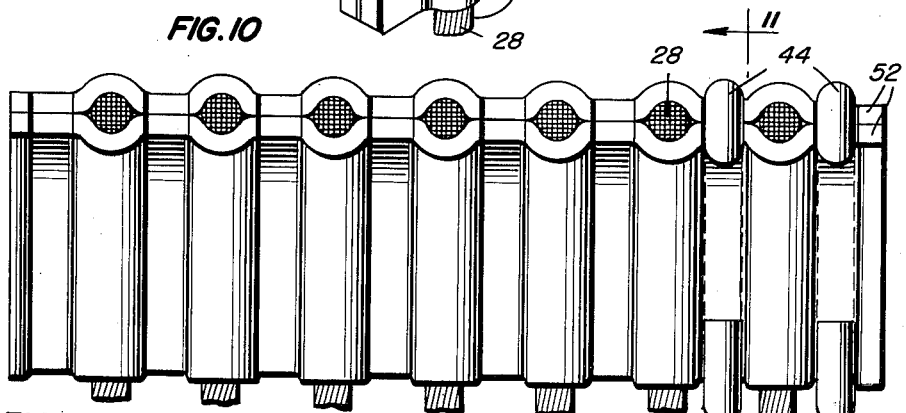
FIG. 10 is an end view of the part shown in FIG. 9.
Figure 11:
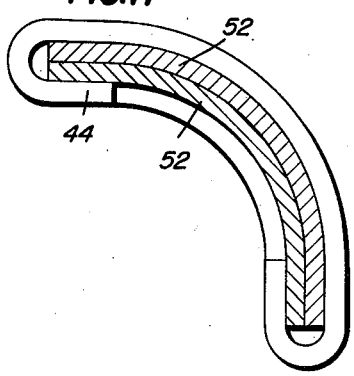
FIG. 11 is a cross section taken in the direction of the arrows 11—11 of FIG. 10.

Sheets 52 are urged together by staples 44 best seen in FIGS. 10 and 11 and additional strength may be gained by perforating the edges of sheets 52 with holes 54 for suitable fasteners.

Figure 7:
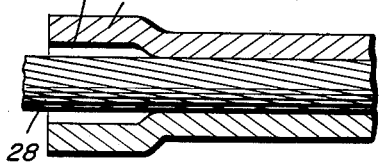
FIG. 7 is a cross section view of one form of cable termination.
Figure 8:
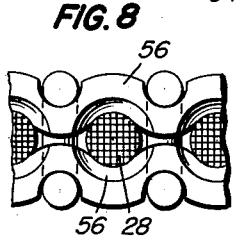
FIG. 8 is an end view of the construction of FIG. 7.

The termination of the cable passages of tie strips 40 and bent sheets 52 may optionally be expanded as shown at 56 in the cross-section detail views of FIGS. 7 and 8. A recess 58, made thereby, tends to eliminate an abrupt shearing edge where cable 28 emerges. It additionally acts as a snubber to shorten the length of the isolator cable 28 under extreme shock condition.

Although the terms vertical and horizontal were used in this description, it should be understood that the vibration isolator of this invention will operate in all attitudes and may be placed otherwise than as described.

Models have been built and tested. It has been found that desirable variations can be made in the natural frequency of the isolators by twisting the stranded cables 28 as they are being strung. The cables can be separate lengths instead of continuous and can be more numerous at one end of the strips to compensate for unsymmetrical load conditions of the supported mass.

The natural frequency of resonance can be controlled by varying the lengths of the cables 28. It is also possible to make a tapered width comb or tie strip. Thus each cable 28 in an isolator is thereby caused to have a different frequency.

As can be seen in the curve of FIG. 13 for a typical case, high frequency noise is attenuated to a great degree. As the magnitude of the load is increased, the natural frequency changes but little. The curves also show that transmissibility drops off beneficially under steady state load.

Obviously many other modifications and variations of the present invention are possible in the light of the above teachings. It is, therefore, to be understood that within the scope of the appended claims the invention may be practiced otherwise than as specifically described.

What is claimed is:

1. A vibration isolator mount comprising spaced pairs of metallic mounting strips, the strips of each pair having corrugations in facing relationship, free multistrand resilient cable portions connecting the pairs of strips, engaged between the facing corrugations of each of said pairs, and means clamping the strips of each pair together between adjacent cable portions.

2. A vibration isolator mount, comprising, structure defining a pair of arcuate strips of corrugated form positioned face to face with each other, and means including a multistrand resilient cable passed back and forth between mating corrugations in said strips in planes substantially perpendicular to the axis of arcuation.

3. A vibration isolator mount arrangement for supporting an object, comprising, at least two isolator mounts positioned adjacent each other for supporting said object, each said mount comprising a pair of metallic strips of corrugated form positioned face to face with each other, means including a multistrand resilient cable passed back and forth between mating corrugations in said strips and means for attaching a supported object to one of said pairs of strips.

4. A vibration isolator mount arrangement as recited in claim 2, and additionally a pair of other isolator mounts positioned on opposite sides of said first mentioned mount and in the plane of said sides, with said resilient cable being passed back and forth between said first mentioned mount and said pair of other isolator mounts.

5. An arrangement as recited in claim 4, wherein said resilient cable is continuous.

6. An arrangement as recited in claim 4, wherein said resilient cable consists of a plurality of individual portions connecting said mounts together.

7. An arrangement as recited in claim 4, wherein the passes of said resilient cable between said mounts are evenly spaced.

8. An arrangement as recited in claim 4, wherein the passes of said resilient cable between said mounts are unevenly spaced.

9. A vibration isolator mount arrangement, comprising, two mating pairs of substantially flat metallic strips located in substantially parallel planes and spaced laterally from each other, means including a multistrand resilient cable passed back and forth between said mating pairs of strips and between each pair of mating strips and means for attaching a supported object to one of said pairs of strips.

10. A vibration isolator mount arrangement as recited in claim 9, wherein each strip has a plurality of corrugations provided transversely to the length thereof, with said resilient cable being positioned between the mating troughs of the corresponding corrugations in each pair of mating strips.

11. A vibration isolator mount arrangement as recited in claim 10, wherein said resilient cable is continuous.

12. A vibration isolator mount arrangement as recited in claim 10, wherein said resilient cable consists of a plurality of individual portions connecting said pairs of mating strips together.

13. A vibration isolator mount arrangement as recited in claim 10, wherein the passes of resilient cable between said pairs of mating strips are evenly spaced.

14. A vibration isolator mount arrangement as recited in claim 10, wherein the passes of resilient cable between said pairs of mating strips are unevenly spaced.

References Cited in the file of this patent

UNITED STATES PATENTS

| | | |
|---|---|---|
| 1,671,764 | Dickey | May 29, 1928 |
| 2,008,158 | Van Dresser | July 16, 1935 |
| 2,133,762 | Williams | Oct. 18, 1938 |
| 2,873,109 | Hartenstein | Jan. 23, 1956 |